United States Patent
Chang et al.

(10) Patent No.: US 10,224,070 B2
(45) Date of Patent: Mar. 5, 2019

(54) DISC GRABBING DEVICE AND OPERATING METHOD THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventors: Jung-Fang Chang, Taipei (TW); Cheng-Wen Huang, Taipei (TW); Ming-Chun Tsao, Taipei (TW); Chien-Shou Chen, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/826,919

(22) Filed: Nov. 30, 2017

(65) Prior Publication Data
US 2019/0027185 A1    Jan. 24, 2019

(30) Foreign Application Priority Data
Jul. 20, 2017 (CN) .......................... 2017 1 0595889

(51) Int. Cl.
G11B 17/08 (2006.01)
G11B 17/12 (2006.01)
G01G 19/42 (2006.01)

(52) U.S. Cl.
CPC ............ *G11B 17/12* (2013.01); *G01G 19/42* (2013.01)

(58) Field of Classification Search
None
See application file for complete search history.

(56) References Cited

U.S. PATENT DOCUMENTS

2013/0094336 A1* 4/2013 Tokuda ............... G11B 23/40
369/30.55

FOREIGN PATENT DOCUMENTS

CN             104200819 B        1/2017

* cited by examiner

*Primary Examiner* — William J Klimowicz
(74) *Attorney, Agent, or Firm* — McClure, Qualey & Rodack, LLP

(57) ABSTRACT

A disc grabbing device including a disc grabbing body, a weight sensing unit and a counter is provided. The disc grabbing body is used for grabbing or unloading at least one disc. The weight sensing unit is disposed on the disc grabbing body for sensing a weight of the at least one disc grabbed on the disc grabbing body. The counter is connected to the weight sensing unit used for obtaining a disc quantity of the discs grabbed on the disc grabbing body according to the weight.

11 Claims, 4 Drawing Sheets

120

| Disc quantity | Lower weight limit (grams) | Upper weight limit (grams) |
|---|---|---|
| 12 | 186 | 198 |
| 11 | 170.5 | 181.5 |
| 10 | 155 | 165 |
| 9 | 139.5 | 148.5 |
| 8 | 124 | 132 |
| 7 | 108.5 | 115.5 |
| 6 | 93 | 99 |
| 5 | 77.5 | 82.5 |
| 4 | 62 | 66 |
| 3 | 46.5 | 49.5 |
| 2 | 31 | 33 |
| 1 | 15.5 | 16.5 |

FIG. 2

DISC GRABBING DEVICE AND OPERATING METHOD THEREOF

This application claims the benefit of People's Republic of China application Serial No. 201710595889.6, filed Jul. 20, 2017, the subject matter of which is incorporated herein by reference.

BACKGROUND OF THE INVENTION

Field of the Invention

The invention relates in general to a grabbing device, and more particularly to a disc grabbing device and an operating method thereof.

Description of the Related Art

The disc archive system, which uses discs as a data storage medium, normally includes multiple disc drives, a disc library for placing multiple discs, and a disc grabbing device. The disc grabbing device is used for grabbing and unloading discs, and moving discs between the disc library and the disc drives. For example, the disc grabbing device grabs discs from the disc library and then moves and unloads the discs to the disc drives, or grabs discs from the disc drives and then moves and unloads the discs to the disc library. To increase the disc handling efficiency, the disc grabbing device may grab multiple discs and then move and unload the multiple discs at one time. For example, the disc grabbing device may grab multiple discs from the disc library and then move and unload the multiple discs to corresponding disc drives respectively. The disc grabbing device may pick up the discs from respective disc drives and then grab the discs on the disc grabbing device. Then, the disc grabbing device may unload the grabbed discs back to the disc library.

To determine the disc quantity of the discs grabbed by the disc grabbing device, the disc grabbing device normally obtains a total height of the grabbed discs according to the displacement of a probe, and then uses the total height of the grabbed discs as a basis for determining the disc quantity of the grabbed discs. According to the above method, a probe structure is disposed on one side of the disc grabbing device, such that the probe can lean on a surface of the grabbed discs. As the disc quantity of the grabbed discs increases, the probe will be pushed by the discs to generate a displacement, and the disc quantity of the grabbed discs can be determined according to the displacement of the probe.

However, since the height of the disc has a tolerance, and the accumulated tolerance may lead to an erroneous determination. For example, when the accumulated tolerance is over the height of a single disc, the disc quantity of the discs may be erroneously determined. Besides, the probe directly contacts the surface of the disc, and therefore may easily scratch or damage the disc.

SUMMARY OF THE INVENTION

The invention is directed to a disc grabbing device and an operating method thereof capable of determining a disc quantity according to a total weight of grabbed discs and further grabbing and/or unloading discs according to the disc quantity.

According to one embodiment of the invention, a disc grabbing device including a disc grabbing body, a weight sensing unit and a counter is provided. The disc grabbing body is used for grabbing or unloading at least one disc. The weight sensing unit is disposed on the disc grabbing body for sensing a weight of the at least one disc grabbed on the disc grabbing body. The counter is connected to the weight sensing unit for obtaining a disc quantity of the discs grabbed on the disc grabbing body according to the weight.

According to another embodiment of the invention, an operating method of a disc grabbing device is provided. The operating method includes following steps: grabbing at least one disc on a disc grabbing body; sensing a weight of the at least one disc grabbed on the disc grabbing body; obtaining a disc quantity of the discs grabbed on the disc grabbing body according to the weight; and determining whether the disc quantity matches a correct disc quantity.

According to another embodiment of the invention, an operating method of a disc grabbing device is provided. The operating method includes following steps: grabbing at least one disc on a disc grabbing body; moving the disc grabbing body to a corresponding disc drive; performing a disc unloading action; sensing a weight of the remaining disc of the at least one disc grabbed on the disc grabbing body; obtaining a disc quantity of the remaining disc grabbed on the disc grabbing body according to the weight; and determining whether the disc quantity matches a correct disc quantity.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 2 is a relationship table of disc quantity and corresponding weight.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

Figure 1A:
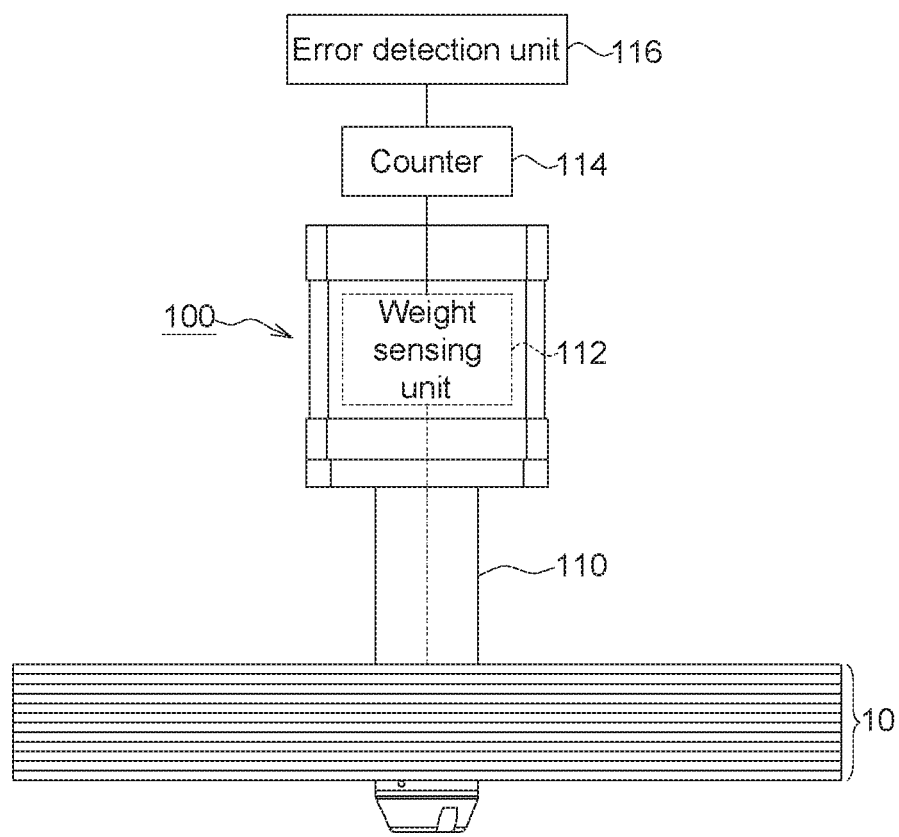
FIG. 1A is a schematic diagram of a disc grabbing device grabbing multiple discs according to an embodiment of the invention.
Figure 1B:
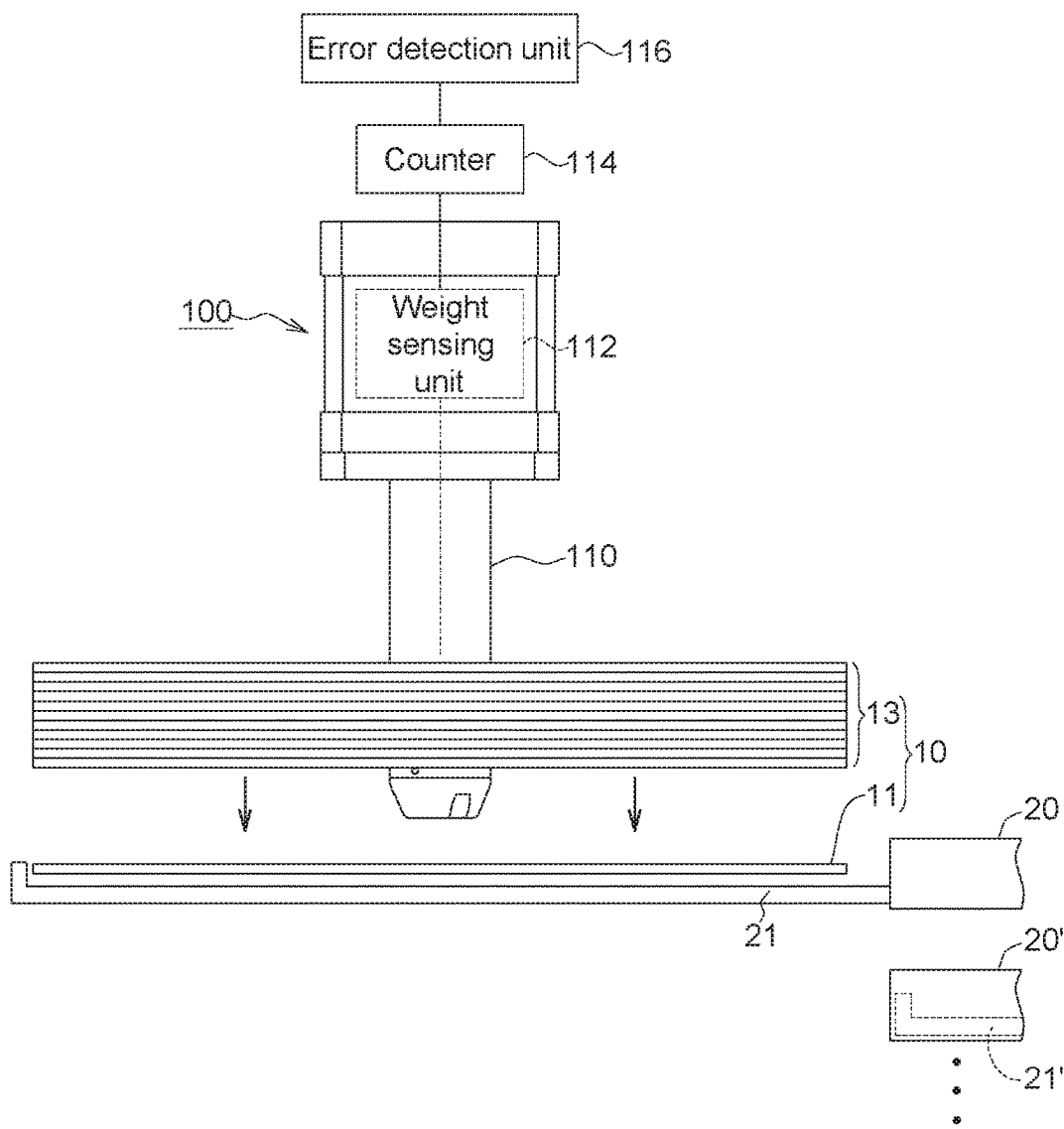
FIG. 1B is a schematic diagram of the disc grabbing device of FIG. 1A unloading a singular disc.

Refer to FIGS. 1A and 1B. FIG. 1A is a schematic diagram of a disc grabbing device 100 grabbing multiple discs 10 according to an embodiment of the invention. FIG. 1B is a schematic diagram of the disc grabbing device 100 of FIG. 1A unloading a singular disc 11. The disc grabbing device 100 includes a disc grabbing body 110, a weight sensing unit 112 and a counter 114. The disc grabbing body 110 may grab multiple discs 10, and then sequentially unload the discs 10 to corresponding disc drives 20 and 20' respectively. As indicated in FIG. 1A, after the disc grabbing body 110 grabs 12 discs 10, the disc grabbing body 110 may move the 12 discs 10 to 12 corresponding disc drives 20 and 20', and correspondingly unload a singular disc to the trays 21 and 21' of the corresponding disc drives 20 and 20' until all of the 12 discs 10 are unloaded to the corresponding disc drives 20 and 20'.

As indicated in FIG. 1B, when the disc grabbing body 110 moves to the first corresponding disc drive 20, the disc grabbing body 110 unloads a singular disc 11 to the tray 21 of the corresponding disc drive 20. Then, the remaining discs 13 still grabbed on the disc grabbing body 110 are moved to the next corresponding disc drive 20'. Meanwhile, the tray 21' of the disc drive 20' is ejected so that the disc grabbing body 110 can unload a next disc 10 to the tray 21'. Conversely, when the discs 10 of the disc drives 20 and 20' need to be replaced, the disc grabbing body 110 can sequentially pick up discs from the trays 21 and 21' of the drives 20 and 20' until all of the 12 discs 10 are grabbed on the disc grabbing body 110.

In the present invention, the disc grabbing body 110 may grab and then sequentially unload multiple discs 10 to the corresponding disc drives respectively. However, the invention does not restrict the disc grabbing design (such as the disc clamping mechanism or the disc unloading mechanism) of the disc grabbing body 110. In an embodiment as indicated in FIG. 1A, the disc grabbing body 110 may enter the central hole of the discs 10 to grab or unload the disc 10 by clamping the edge of the central hole of the disc 10 using a clamping mechanism (not illustrated). In other embodiments, the disc grabbing body 110 may grab or unload the discs 10 by clamping the outer peripheral of the disc 10 using a clamping mechanism.

In the present embodiment, the weight sensing unit 112 is disposed on the disc grabbing body 110 for sensing a weight of the discs 10 grabbed on the disc grabbing body 110. In an embodiment, after the disc grabbing body 110 grabs or unloads discs, the weight sensing unit 112 may sense the weight of the discs 10 grabbed on the disc grabbing body 110 to obtain disc weights at different time points. As indicated in FIG. 1A, after the disc grabbing body 110 grabs 12 discs 10, the weight sensing unit 112 may sense the weight of the 12 discs 10 grabbed on the disc grabbing body 110 to obtain a disc weight at the current time point. As indicated in FIG. 1B, after the disc grabbing body 110 unloads the disc 11, the weight sensing unit 112 may sense the weight of the remaining discs 13 grabbed on the disc grabbing body 110 to obtain a disc weight at the current time point.

In the present embodiment, the counter 114 is connected to the weight sensing unit 112 for obtaining a disc quantity of the discs grabbed on the disc grabbing body 110 according to the disc weight obtained by the weight sensing unit 112.

In an embodiment, the counter 114 obtains the disc quantity of the discs grabbed on the disc grabbing body 110 by a look-up method. Referring to FIG. 2, a relationship table 120 of disc quantity vs corresponding weight is shown. Multiple disc quantities and their corresponding weight ranges are set in the relationship table 120. Thus, the counter 114 may look up the relationship table 120 according to the disc weight obtained by the weight sensing unit 112 to obtain a corresponding disc quantity. For example, when the disc weight obtained by the weight sensing unit 112 is 157 grams, the counter 114 may obtain the disc quantity of the discs grabbed on the disc grabbing body 110 by looking up the relationship table 120 and determine that the disc quantity is 10. According to the disc quantities and their corresponding weight ranges indicated in the relationship table 120, corresponding weight ranges of the multiple disc quantities do not overlap. Therefore, disc quantity can be accurately determined according to disc weight, and erroneous determination can be effectively avoided.

In another embodiment, the counter 114 can set a lower weight limit and an upper weight limit of a singular disc for estimating the disc quantity according to the disc weight obtained by the weight sensing unit 112. For example, the lower weight limit and the upper weight limit of a singular disc is within a range of (M−P)−(M+P) grams, wherein M is such as 16 grams, P is such as 0.5 grams, and P is an error value. The lower weight limit and the upper weight limit of N discs are obtained by multiplying the lower weight limit and the upper weight limit of a singular disc with the disc quantity N, that is, the lower weight limit and the upper weight limit of N discs can be expressed as: N*(M−P)−N*(M+P) grams. Therefore, the counter 114 can estimate disc quantity according to the lower weight limit and the upper weight limit of a singular disc and the disc weight obtained by the weight sensing unit 112. Suppose the weight sensing unit 112 obtains a disc weight of 157 grams. Given that the lower weight limit and the upper weight limit of a singular disc form a weight range of 15.5-16.5 grams and that the weight of 157 grams is within the weight range of 10 discs, that is, 155-165 grams, the counter 114 may estimate that the disc quantity is 10.

Refer to FIGS. 1A and 1B. The disc grabbing device 100 may further include an error detection unit 116. The error detection unit 116 is connected to the counter 114 for determining whether the disc quantity of the discs grabbed by disc grabbing device 100 is correct and accordingly controlling the disc grabbing device 100 to re-grab and/or re-unload discs according to the result of determination. In the present embodiment, the error detection unit 116 determines whether errors occur to the action of grabbing or unloading discs according to the disc quantity provided by the counter 114, and the next step depends on the result of determination.

Figure 3:
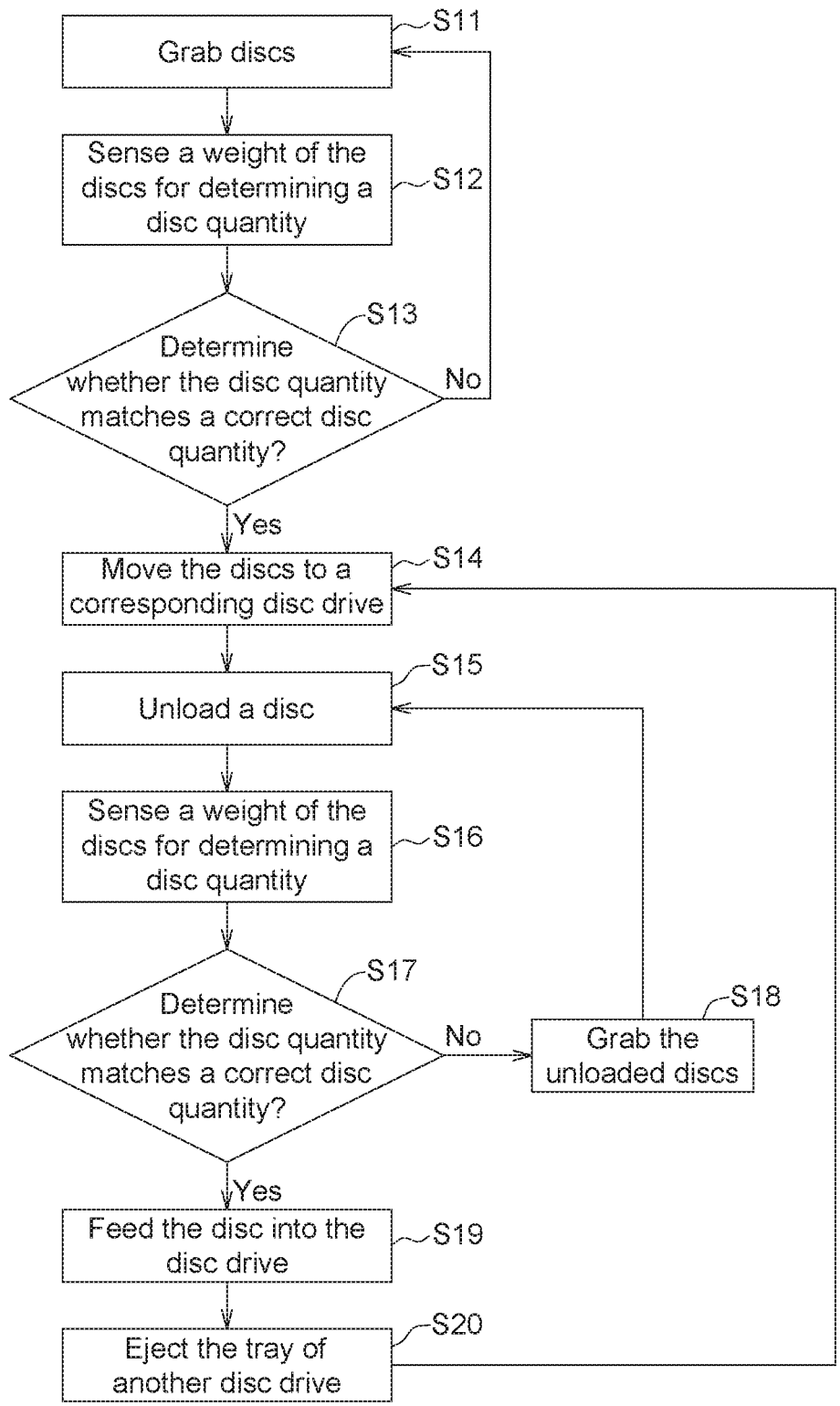
FIG. 3 is a flowchart of an operating method of a disc grabbing device according to an embodiment of the invention.

Refer to FIGS. 1A, 1B and 3. FIG. 3 is a flowchart of an operating method of a disc grabbing device 100 according to an embodiment of the invention. The operating method includes following steps. Firstly, at step S11, the disc grabbing device 100 grabs discs, that is, the disc grabbing body 110 grabs at least one disc 10 and holds on the disc grabbing body 110. Then, at step S12, the weight sensing unit 112 senses a weight of the discs 10 grabbed on the grabbing body 110 for determining a disc quantity of the discs 10 grabbed on the disc grabbing body 110.

In the present embodiment, a correct disc quantity can be set before the disc grabbing device 100 grabs and unloads discs. Before step S11 of grabbing discs is performed, suppose that the disc grabbing device 100 is set to grab 12 discs, that is, the correct disc quantity is 12. Then, after the disc grabbing device 100 completes grabbing discs in step S11, the method proceeds to step S12, the weight sensing unit 112 senses a weight of the discs 10 grabbed on the disc grabbing body 110. Then, the counter 114 can obtain a disc quantity of the discs 10 grabbed on the disc grabbing body 110 according to the disc weight obtained by the weight sensing unit 112. As disclosed above, the counter 114 can obtain the disc quantity by a look-up method, an estimation method or other methods according to the disc weight, and the details are not repeated here.

Then, at step S13, the error detection unit 116 determines whether the disc quantity obtained by the counter 114 matches the correct disc quantity set above. If the obtained disc quantity does not match the correct disc quantity, this implies that the disc grabbing device 100 may have grabbed either too many or too less discs. Therefore, the disc grabbing device 100 needs to returns to step S11 so that the disc grabbing body 110 can grab discs again. If the obtained disc quantity matches the correct disc quantity, then the method proceeds to step S14.

In step S14, the disc grabbing body 110 moves the grabbed discs 10 to a corresponding disc drive, and the tray of the corresponding disc drive will be ejected for the disc grabbing device 100 to unload a disc. In step S15, the disc grabbing device 100 unloads a disc. Similarly, a correct disc quantity can be set before the disc grabbing device 100 unloads a disc. Like the previous example, before step S15 is performed, suppose that the disc grabbing device 100 is set to unload 1 disc, that is, the correct disc quantity is 11. After the disc grabbing device 100 unloads a disc in step S15, the method proceeds to step S16, the weight sensing unit 112 senses a weight of the discs 10 grabbed on the disc grabbing body 110. The counter 114 can obtain a disc quantity of the discs 10 grabbed on the disc grabbing body 110 according to the disc weight obtained by the weight sensing unit 112.

Then, at step S17, the error detection unit 116 determines whether the disc quantity obtained by the counter 114 matches the correct disc quantity. If the disc quantity does not match the correct disc quantity, this implies that the disc grabbing device 100 has either unloaded too many or too less discs. Therefore, the method proceeds to step S18, the disc grabbing device 100 grabs unloaded discs. Then the method returns to step S15, the disc grabbing body 110 unloads a disc again. If the disc quantity of the discs 10 matches the correct disc quantity, then the method proceeds to step S19, the disc is fed into the disc drive. Then, the method proceeds to step S20, the tray of another disc drive is ejected. Then, the method returns to step S14, the disc grabbing body 110 moves the grabbed discs 10 to a next corresponding disc drive for disc unloading again. In the present embodiment, the next corresponding disc drive is another disc drive with an ejected tray.

In above embodiments, the disc grabbing device 100 can repeat steps S14-S20 until all of the discs 10 grabbed on the disc grabbing body 110 are unloaded.

According to the disc grabbing device and the operating method thereof disclosed in above embodiments of the invention, the determination of disc quantity is based on weight sensing, and the determined disc quantity is further used as a basis for grabbing or unloading discs and performing error detection. Moreover, the invention does not need to reserve a space for the probe, not only dispensing with an additional installation structure, which would otherwise be required when the disc quantity is determined using a highly sensitive probe, but also avoiding the problem of erroneous determination caused by the accumulated error values of the disc height. Furthermore, the invention adopts weight sensing which obtains the weight without directly contacting the discs, hence resolving the problem of the disc surface being scratched or damaged due to the directly contact of the probe.

While the invention has been described by way of example and in terms of the preferred embodiment(s), it is to be understood that the invention is not limited thereto. On the contrary, it is intended to cover various modification and similar arrangements and procedures, and the scope of the appended claims therefore should be accorded the broadest interpretation so as to encompass all such modification and similar arrangements and procedures.

What is claimed is:

1. An operating method of a disc grabbing device, comprising steps of:
    performing a disc grabbing action to grab at least two disc on a disc grabbing body;
    sensing a weight of the at least two disc grabbed on the disc grabbing body;
    obtaining a disc quantity of the at least two disc grabbed on the disc grabbing body according to the weight; and
    determining whether the disc quantity matches a correct disc quantity,
    wherein when it is determined that the disc quantity does not match the correct disc quantity, the disc grabbing body performs the disc grabbing action again.

2. The operating method according to claim 1, wherein the disc quantity of the at least two disc is obtained by a look-up method according to the weight.

3. The operating method according to claim 1, wherein the correct disc quantity is set before the disc grabbing body performs the disc grabbing action or a disc unloading action.

4. The operating method according to claim 1, wherein if when it is determined that the disc quantity matches the correct disc quantity, the disc grabbing body moves to a corresponding disc drive to perform a disc unloading action.

5. The operating method according to claim 1, wherein before the disc grabbing body performs a disc unloading action, the correct disc quantity of the at least two disc left after the disc unloading action is set, and after the disc unloading action, the disc grabbing body grabs the unloaded disc and performs the disc unloading action again when it is determined that the disc quantity does not match the correct disc quantity.

6. The operating method according to claim 5, wherein when it is determined that the disc quantity matches the correct disc quantity, the disc grabbing body moves to a corresponding disc drive to perform the disc unloading action.

7. An operating method of a disc grabbing device, comprising steps of:
    grabbing at least two disc on a disc grabbing body;
    moving the disc grabbing body to a corresponding disc drive;
    performing a disc unloading action;
    sensing a weight of the remaining disc of the at least two disc grabbed on the disc grabbing body;
    obtaining a disc quantity of the remaining disc grabbed on the disc grabbing body according to the weight; and
    determining whether the disc quantity matches a correct disc quantity.

8. The operating method according to claim 7, wherein the disc quantity is obtained by a look-up method according to the weight.

9. The operating method according to claim 7, wherein the correct disc quantity is set before the disc grabbing body performs the disc unloading action.

10. The operating method according to claim 7, wherein the disc grabbing body grabs the unloaded disc and performs the disc unloading action again when it is determined that the disc quantity does not match the correct disc quantity.

11. The operating method according to claim 7, wherein when it is determined that the disc quantity matches the correct disc quantity, the disc grabbing body moves to a next corresponding disc drive to perform the disc unloading action.

* * * * *